United States Patent [19]
Fowler

[11] Patent Number: 6,076,340
[45] Date of Patent: *Jun. 20, 2000

[54] SUGAR CANE COMBINE HARVESTER

[75] Inventor: Larry Fowler, Miami, Fla.

[73] Assignee: Inter-American Vanguard Corporation, Miami, Fla.

[*] Notice: This patent issued on a continued prosecution application filed under 37 CFR 1.53(d), and is subject to the twenty year patent term provisions of 35 U.S.C. 154(a)(2).

[21] Appl. No.: 09/009,298

[22] Filed: Jan. 20, 1998

[51] Int. Cl.⁷ .............................. A01D 45/10; A01D 34/03
[52] U.S. Cl. .............................................. 56/13.9; 56/13.3
[58] Field of Search ...................................... 56/13.7, 13.9, 56/14.3, 14.5, 13.3, 12.9, 16.4, 16.5, 119, DIG. 1, 56, 63, 121.44; 460/57, 97, 123

[56] References Cited

U.S. PATENT DOCUMENTS

| | | |
|---|---|---|
| D. 259,045 | 4/1981 | Mende . |
| 3,828,536 | 8/1974 | Fowler . |
| 3,863,431 | 2/1975 | Fowler . |
| 3,946,875 | 3/1976 | Fowler . |
| 3,963,138 | 6/1976 | Fowler . |
| 4,166,349 | 9/1979 | Coenenberg et al. . |
| 4,327,945 | 5/1982 | Fowler . |
| 4,343,140 | 8/1982 | Hegger . |
| 4,408,441 | 10/1983 | Willett . |
| 4,426,826 | 1/1984 | Wesselmann . |
| 4,443,999 | 4/1984 | Leigers . |
| 4,470,244 | 9/1984 | Leigers . |
| 4,471,602 | 9/1984 | Leigers . |
| 4,609,318 | 9/1986 | Rodrigue et al. . |
| 4,677,813 | 7/1987 | Stiff et al. . |
| 4,878,341 | 11/1989 | Giardina et al. . |
| 4,897,986 | 2/1990 | Baker et al. . |
| 4,962,637 | 10/1990 | Giardina et al. . |
| 5,013,207 | 5/1991 | Baker et al. . |
| 5,031,392 | 7/1991 | Baker . |
| 5,092,110 | 3/1992 | Dommert et al. . |
| 5,129,219 | 7/1992 | Baker . |
| 5,131,216 | 7/1992 | Otten et al. . |
| 5,138,819 | 8/1992 | Andre . |
| 5,157,904 | 10/1992 | Otten et al. . |
| 5,191,759 | 3/1993 | Baker . |
| 5,235,798 | 8/1993 | Giardina et al. . |
| 5,566,773 | 10/1996 | Gersmann . |
| 5,622,034 | 4/1997 | Dommert . |

*Primary Examiner*—Robert E. Pezzuto
*Attorney, Agent, or Firm*—Jacobson, Price, Holman, & Stern, PLLC

[57] ABSTRACT

A sugar cane combine harvester having a topper/shredder in advance of a crop divider mechanism with the crop divider aiding in moving sugar cane to a knock down feed roll, base cutters, a feed roll system, a chopping system including a cleaning system, and an elevator system.

21 Claims, 11 Drawing Sheets

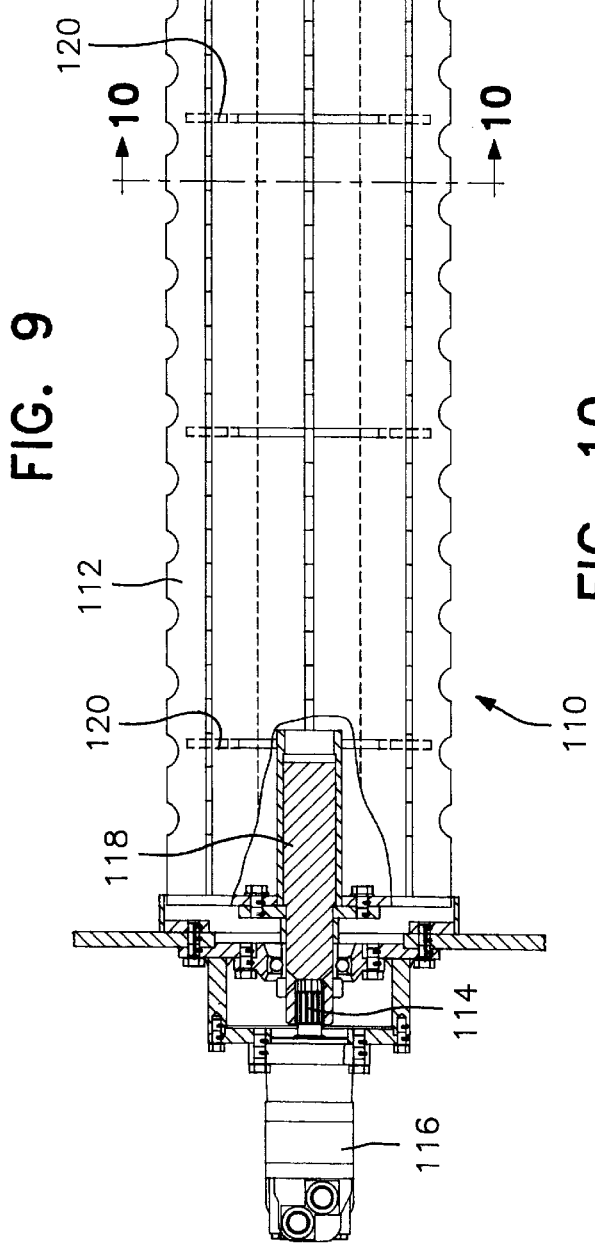
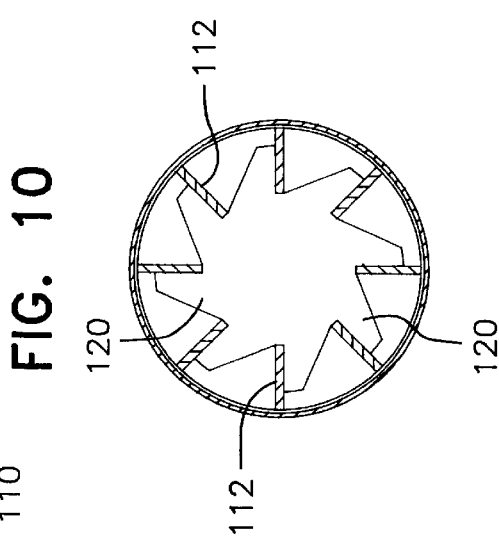
FIG. 9
FIG. 10

SUGAR CANE COMBINE HARVESTER

FIELD OF THE INVENTION

The present invention relates to an apparatus for ordering rows of sugarcane, removing an upper stalk portion and cutting the cane at its base for harvesting of the cane. The cane is transported through the apparatus and the cane is separated from debris by a network of feed rolls and choppers. The cut cane is further separated from debris by a series of blowers and an elevator system.

BACKGROUND OF THE INVENTION

Sugarcane (saccharum officinarum) is a giant, thick, perennial grass cultivated in tropical and subtropical regions throughout the world for its sweet sap. The plant grows in clumps of solid stalks and has sword-shaped leaves and many jointed stems. Mature canes can grow to 10 to 26 feet in height and 1 to 2 inches in diameter.

Although several cane-cutting machines have been used with some success, most of the sugarcane in the world is harvested by hand where labor costs are low. Cane is cut at or near the surface of the ground, stripped of its leaves by a knife, and trimmed at the top near the last mature joint. The cane is then piled in rows along the ground until picked up by hand or machine, and transported by cart or truck to a sugar factory, where a grinding mill extracts the sugar from the cane.

In industrialized countries, in many cases, cane is burned to get rid of leaves that hinder harvesting and processing. Upright cane is then harvested by machines that straddle a row, cutting and topping the stalks, stripping the leaves, and loading the crop into trailers. The longer, thicker, leaning cane that grows in some areas is piled in windrows by hand or by bulldozer and then loaded with huge, grab forks into trucks for transport to a sugar mill.

SUMMARY OF THE INVENTION

The harvester apparatus of the present invention can produce cane pour rates of 80 to 100 tons per hour or effectively 50 to 70 tons per hour in burned cane, depending on field conditions, cane varieties, and densities. In green cane, pour rates will be approximately 80 tons per hour or effective rates of approximately 50 tons per hour. The capacity of the wide throat of the harvester of the present invention is capable of harvesting cane in excess of 80 tons per acre.

The single row/tire version of the harvester weighs approximately 25,000 pounds and has a ground pressure of 10 PSI. The two-row version weighs approximately 33,000 pounds and has a ground pressure of approximately 5 PSI. Normal operating speed of the unit is approximately up to 7 mph and transport speed of the unit is approximately up to 14 mph.

The topper is of a shredder type, reducing cane tops to small pieces for easy incorporation in field soils during post harvest cultivation processes. This type of topper provides aggressive cutting action, as compared to an auger system, to totally eliminate tops.

The sugarcane gathering system of the present invention includes crop lifters which are set forward on the head of the apparatus at a steep angle to actively separate and lift downed or lodged cane with comb-like action. Abrasive-resistant materials are used on skid plates for increased service life. The mounting system for the crop lifters uses a "floating" skid which acts independently from the cutting discs to follow the contour of the ground and reduce the loss of cane stalks passing under the skids.

The knock-down roller is positioned forward from and above the base-cutter discs to orient cane for feedling into the feed rollers before the discs cut the stalks. The knock down roller uses large fins to assist in cane separation. The adjustable positioning of the knock-down roller can handle varying harvesting conditions and cane varieties.

A high capacity "throat" to the cutter head of approximately 54" wide provides minimal obstruction for good cane flow, especially in green cane and/or high density conditions. This is ideal for harvesting two-rows of cane on 0.9, 1.0, or 1.1 meter row-spacings or a single row on 1.4, 1.5, or 1.6 meter spacing.

A drive system for the cutters discs includes direct drives from an overhead position. This allows opening up the width of the throat for increased production.

The location of the discs allows for visibility of the blades from the operator's cab. The position of the system with respect to front tires provides direct, ground contouring capability to reduce losses under the harvester as well as damage to future growth by "scalping" ratoons. The base cutter discs are adjustable to maintain optimum cutting angle on rows ranging up to 15" in height.

An open feed roller system acts as a preliminary cleaning mechanism by removing dirt and extraneous materials before it can enter the harvester. This also increases the life of components such as floors, slats, chains, and guide rails. The motor/shaft design, with direct interconnection and protective housing and cover, reduces potential damage to seals and bearings;.

The chopping mechanism has triple-bladed drums provided for better cleaning of extraneous material and increased transport density on wagons and trailers. Optionally, double-bladed drums may be used. The direct drive system of the drums eliminates belts and pulleys. The disposable, quick-change blades save time and reduce costs.

The cleaning system includes a main blower of self-cleaning design to reduce clogging with leaves and debris. The blower provides constant flow through of air to the cleaning chamber located immediately behind the chopper drums. This location provides best cleaning potential under severe, green or heavy crop conditions. A secondary blower provides additional airflow through the cleaning chamber to remove extraneous material.

A blower of the discharge elevator provides additional airflow through cane cascading downward from the elevator's end for more effective removal of extraneous material. The discharge elevator is double folding to reduce overall dimensions of the unit for transport purposes. A level (horizontal) discharge point eliminates the loss of cane from wrapping. Sprockets are used to reduce wear on guide rails and chains. The slat/chain design is light-weight and allows for lateral adjustment to increase chain life. In addition, it is made of high strength material to resist bending under heavy loads.

Adjustable hood guides direct cane flow into transport equipment. This design allows flexible movement of air flow from the blower together with the hood.

The operator's platform located in the cab includes, manual levers for a direct linkage to the hydraulic valves. Instead of electronic controls and/or computer devices, which have proven to be highly unreliable and difficult to service, gauges and warning lights are well positioned for the operator to view at a glance during normal operation of the unit. Foot pedals are used to move the harvester forward or reverse, as well as to actuate or stop the discharge elevator. This frees the operator's hands to control the levers and steering of the unit.

A large, front, safety glass provides a view of the sugarcane rows and the cutting head to assist the operator during harvesting. The location of the platform is offset for better visibility of the base-cutter discs, crop lifting scrolls, the feed rollers, the topper, the discharge elevator, and the transport equipment.

Air conditioning and heat are provided in the cab for maximizing comfort of the operator in the cab. A high back, air-cushioned seat with arm rests provides padded support during long hours of operation. A central hydraulic valve bank is located directly behind the operator's platform for ease of access.

The hydraulic tank system has been divided to maintain the propulsion (transmission) system separate from the various operations of the machine. In the event of a failure of a motor or a pump, contamination is reduced, allowing the unit to drive out of a field or to a workshop. Protection systems are used to shut down engine and prevent pump/motor burnouts in the event of loss of oil or hydraulic fluid. The engine group is skid mounted to provide for easy change of CATERPILLAR, JOHN DEERE, DETROIT DIESEL, or CUMMINS engine components, depending on customer preference. This allows easy removal in the event of a major failure.

The air intake and exhaust systems have been situated, and protected, from excess leaves and debris, which can cause fires. A safety shut-off system is activated by low water level or low oil level.

The chassis includes a wide layout (120" track) for stability of the front and rear axles of the harvester. Even weight distribution provides low ground pressure to each of the four tires (23.1×26 front and 18.4×26 rear). High ground clearance (24" under chassis frame) allows for working in conditions with high cane rows without interference.

The rear axle is of an oscillating type with heavy-duty steering knuckles and free-wheeling rear tires (2-wheel drive—front). Without changing wheels, knuckles are designed to receive a final drive kit to convert the unit to four wheel drive (front and rear).

In the operation of the present invention, the first part of the sugar cane combine harvester to engage the sugar cane is the topper/shredder. This unit is attached to the harvester through parallel arms, which maintain the constant attitude of the topper to the cane as the topper is moved vertically by hydraulic means to sever, and shred the cane tops at an optimum height.

The topper/shredder is composed of two hydraulically driven gathering discs which pull the cane tops into the topper/shredder. A plurality of blade segments, mounted on discs, attached to a hydraulically driven vertical drum shred the cane tops and leaves into short pieces. These pieces are directed to the ground to the side of the line of travel of the machine through a small chute. Since cane tops contain gums and resins which are detrimental to sugar cane processing, it is extremely important that these tops be removed from the sugar cane prior to processing of the cane at the factory.

The crop divider mechanism consists of conical shaped cylinders with raised spiral flighting or scrolls. These scrolls move between the cane rows and comb the cane stalks, which have crossed into adjacent rows, back into their original rows. They also begin the orientation of the cane stalks for introduction into the harvester gathering system.

The operator's left side of the machine has a single scroll, while the right side (or standing cane side) of the machine may have two scrolls which form a "V" from the ground line to better and more gently separate tangled cane. Both sets of scrolls are designed to move vertically by parallel arms hydraulicly operated to constantly maintain the same attitude to the cane.

A link system between the hydraulic lift cylinders and the parallel arms provide a true floating system for the scroll frame. This system allows the skid plates of the crop divider mechanism to slide along, and contour the ground for positive lift of recumbent cane for separation. The left side scroll can be moved or adjusted horizontally to widen or narrow the distance between the right side and two left side scrolls to accommodate heavier cane or multiple rows of cane planted on narrow row spacing.

After the crop dividers or scrolls separate the cane, the cane stalks come into contact with the knock down feed roll. Forward movement of the machine pushes the cane stalk top away from the machine, and in conjunction with the crop dividers, orients the cane for introduction into the feed system or throat of the machine.

The fin like plates and paddles of the knock down feed roll, along with the forward movement of the machine, moves the cane into the gathering system or throat. The knock down feed roll is vertically adjustable at an angle with the ground line to maintain the optimum position of the cane stalks relative to the base cutters for introduction into the machine.

The cane stalks are cut at their base by counter rotating discs outfitted with replaceable cutting segments or base cutter blades. The discs are designed for and placed at an angle to the ground line with the apex of the triangle formed with the ground line making first contact with the base of the cane stalks. The discs are also outfitted with lifter bars to move the base of the cut cane stalks up and into the machine feed system.

The base cutter discs and feed roll system are fixed in a common frame or cutter head and are jointly moved vertically by hydraulic cylinders to cut the cane stalks at the optimum position at their base. The base cutter disc angle can be changed hydraulically or manually, independently from the cutter head, to accommodate varying cane row heights.

The diameter of the discs is designed such that the base cutter blades overlap. The overhead drive mechanism of the discs is designed to provide an accurate synchronization and timing of the discs' rotation. The overlapping of the blades provides a constant cutting line or front across the width of the throat of the machine gathering system, allowing the cutting of multiple rows of cane planted on narrow row spacing.

Immediately behind the base cutter discs, a paddle type roll or butt-lifter roll lifts the bases of the cut cane stalk and feeds the stalks longitudinally into a plurality of feed rolls. The feed rolls further move the cane to the chopping system, which segments the cane stalks and leaf matter into pre-set lengths. The feed rolls are hydraulically powered and are of an open design, which allows soil and trash to fall through the ground thus initiating the cleaning process in the machine.

The top feed rolls are pivoted to allow a floating action to accommodate varying amounts of cane introduced into the machine. The simple motor/shaft drive design provides a protective housing and cover to reduce damage to bearings and seals, and simplifies maintenance in the machine.

The chopping mechanism is composed of counter rotating parallel drum shafts or choppers outfitted with blades at three set positions on the drum shafts. A set of hydraulic motors, mounted on the right end side of the choppers, drive the mechanism. On the other end, a set of timing gears with an adjusting apparatus keeps the knife blades in synchronization so as to segment the cane stalks and leaves as they enter the chopping mechanism.

As the cane pieces leave the chopping mechanism, they fall from the choppers through an air stream created by a blower located beneath the choppers. The blower blows the leaf matter and debris from the material expelled from the choppers up and through a duct directing the leaves and trash to the ground behind the machine.

A second blower creates a high volume, high velocity air stream above the primary blower air stream. The force of the second air stream directed up along an upper surface of a discharge duct produces a vacuum effect on the materials pushed by the primary blower to the duct. This boosts the materials through the duct and to the ground.

The chopped cane pieces, which are expelled from the choppers and are exposed to the primary air stream for separation of debris, fall into a loading elevator. The elevator moves the cane from the machine into the transport equipment moving alongside the machine.

A third blower, located beneath and attached to the loading elevator creates an air stream, which is directed through the cane pieces as they cascade out from the elevator into the transport equipment. The third air stream further cleans extraneous matter from the cane and directs it to the ground beyond.

A deflecting hood at the discharge end of the elevator deflects the cane, discharging from the elevator to the harvester side or to the far side of the infield transport unit for better load distribution. Hydraulic cylinders move the deflecting hood to the desired position while an attached linkage simultaneously moves the air duct to automatically position the air stream for moving the extraneous material across the top of the transport vehicle and to the ground.

Accordingly, it is an object of the present invention to provide a sugar cane combine harvester which efficiently harvests sugar cane and maximizes separation of cane pieces from cane debris.

It is another object of the present invention to provide a sugar cane combine harvester having a topper/shredder in advance of a crop divider mechanism with the crop divider aiding in moving sugar cane to a knock down feed roll, base cutters, a feed roll system, a chopping system including a cleaning system, and an elevator system.

It is another object of the present invention to provide a sugar cane combine harvester including a crop divider mechanism including at least two spiral scrolls movable vertically to slide across the ground and separate and move sugar cane into position for harvesting.

It is still yet another object of the present invention to provide a sugar cane combine harvester having a knock down roll for tilting sugar cane in a path of travel of the harvester so as to expose the base of the sugar cane to rotating base cutters extending at an angle to the ground and to pass the cut sugar cane to a butt-lifter roll which longitudinally feeds cut sugar cane to a plurality of feed rollers leading to chopping rollers.

It is also another object of the present invention to provide a sugar cane combine harvester which after gathering and chopping sugar cane includes an air cleaning system for separating chopped cane from its debris by a plurality air blowers spaced along the path of travel of the chopped cane for repeatedly removing debris from the chopped cane pieces.

These and other objects of the invention, as well as many of the intended advantages thereof, will become more readily apparent when reference is made to the following description taken in conjunction with the accompanying drawings.

BRIEF DESCRIPTION OF THE DRAWINGS

FIG. 9 is a partial sectional view of a feed row assembly.

FIG. 10 is a sectional view taken along line 10—10 of FIG. 9.

DETAILED DESCRIPTION OF THE PREFERRED EMBODIMENTS

Figure 1:
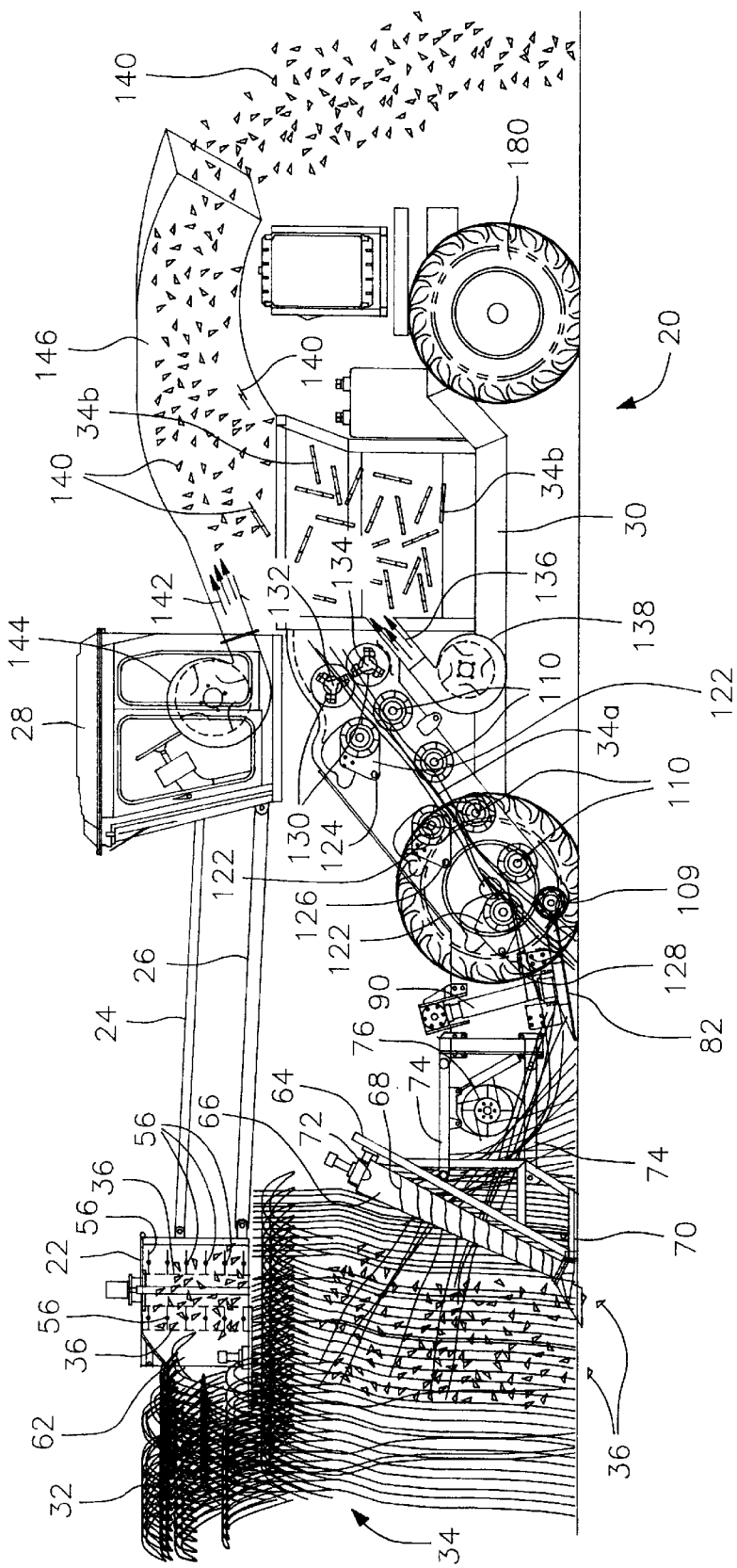
FIG. 1 is a schematic representation of the sugar cane combine harvester of the present invention with an elevator system omitted for purposes of clarity.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 4:
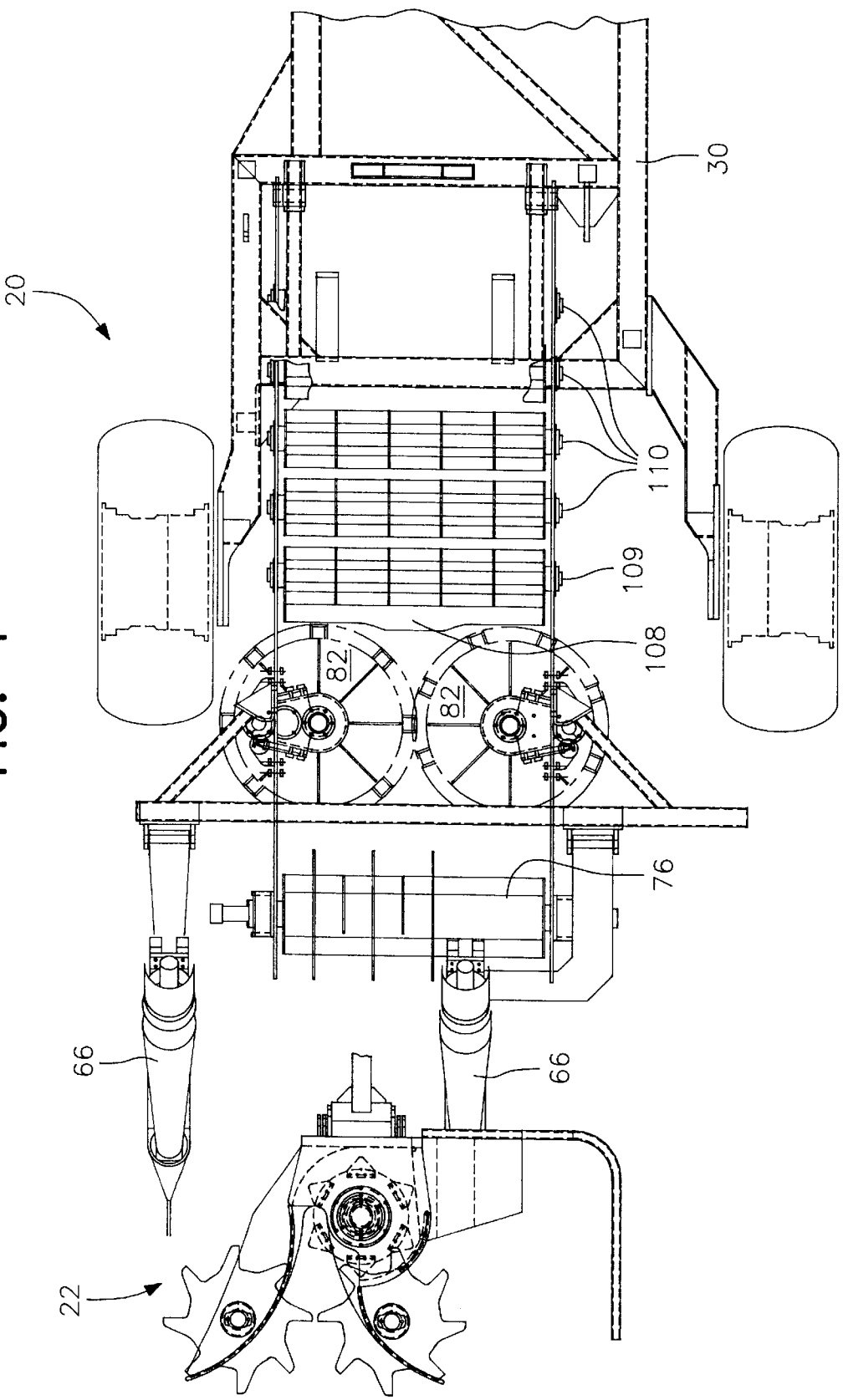
FIG. 4 is a schematic plan view of the harvester of the present invention including the topper/shredder system, the crop divider mechanism, the knock down feed roller, the base cutters, the feed roller system and the chopping system.

With reference to the drawings, in general, and to FIGS. 1 and 4, in particular, a sugar cane combine harvester embodying the teachings of the subject invention is generally designated as 20. With reference to its orientation in FIG. 1, the sugar cane combine harvester includes a topper/shredder mechanism 22 pivotally mounted by parallel arms 24, 26 to an operator's cab 28 mounted on a chassis 30. The arms 24, 26 are moved by a hydraulic system to a predetermined optimum height for cutting the tops 32 of sugar cane 34. The debris 36 which results from the cutting of the tops 32 of the sugar cane 34 is ejected from the side 38 of the mechanism 22.

Figure 2:
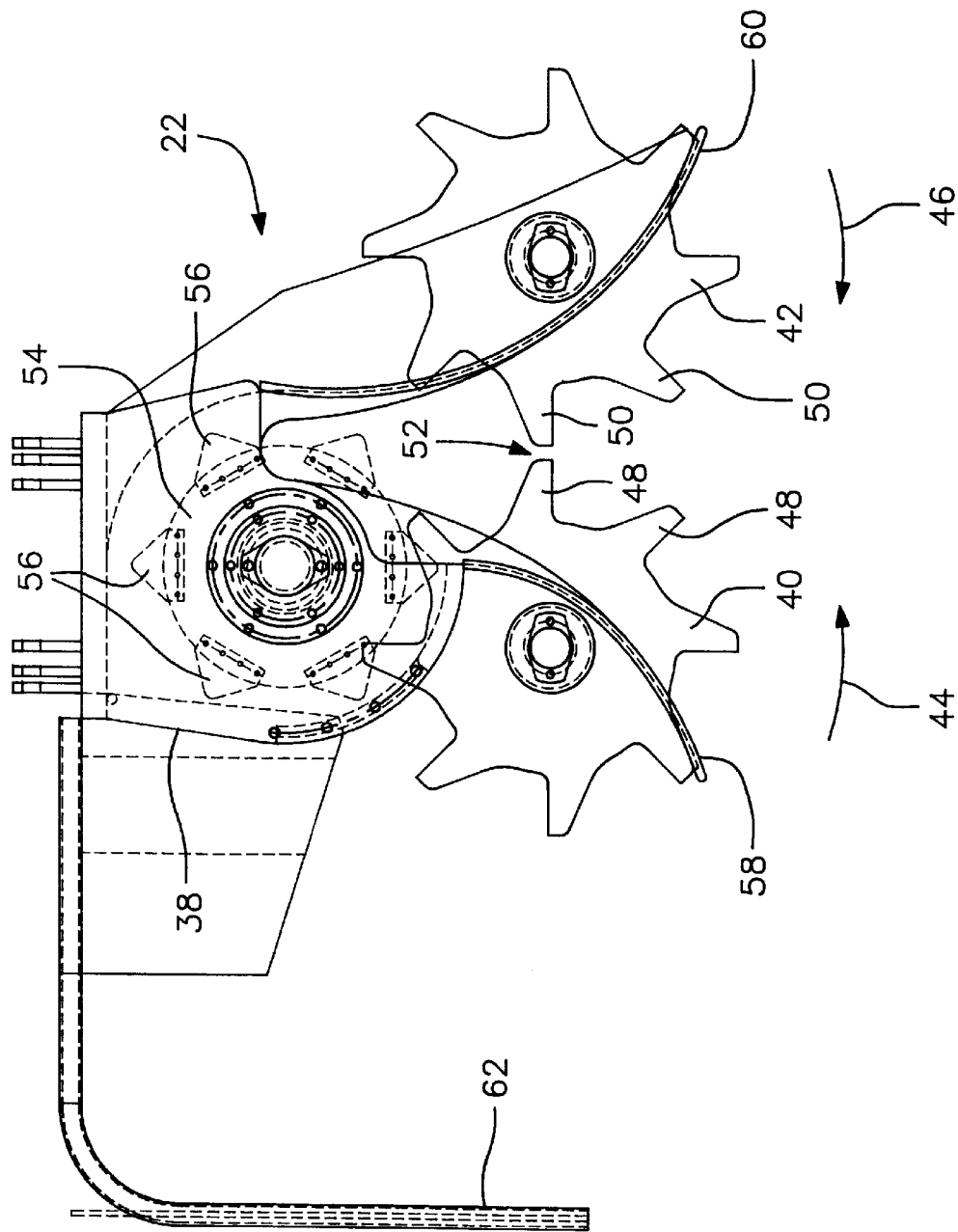
FIG. 2 is a plan view of the topper/shredder system of the harvester for trimming the tops of sugar cane being harvested.

The mechanism 22, as shown in FIG. 2, is moved from a height of approximately 3 feet to 13 feet by a hydraulic cylinder actuating the arms 24, 26, dependent upon the height of the tops 32 of the sugar cane 34 to be harvested. The mechanism includes two gathering discs 40, 42 which turn in the direction of arrows 44, 46, respectively, so as to engage the tops 32 of the sugar cane between teeth 48, 50. The discs 40, 42 turn at a speed of 160 rpm. As the discs turn, and the teeth 48, 50 approach each other, there is formed a gap 52 of approximately one inch. The shape of the gathering fingers on the disc are such that their configuration forces the cane tops towards a shredder drum 54 having rows of cutting segments 56 spaced about the drum 54 and along the drum 54. Due to the shape of the teeth 48, 50, the fingers release, and do not pinch, the cane tops between the discs 40, 42 and the curved framed sections 58, 60.

The shredder drum is a vertical cylinder to which six discs are attached circumferentially and each row of cutter segments includes six segments so as to cut the cane tops into approximately six inch lengths. The shredder drum is turned by a hydraulic motor at the speed of approximately 1350 rpm. The shredder cane tops are forced through side opening 38 into contact with hanging fabric sections 62 so as to guide the debris is 36 to the ground adjacent to the line of travel of the machine.

A crop divider mechanism 64 includes conically shaped cylinders 66 with raised spiral flighting 68. The cylinders 66 are mounted in a sliding shoe frame 70. The top 72 of the cylinders 66 are mounted on flange cartridge bearings and are driven by hydraulic motors at a speed of 185 rpm.

Figure 3:
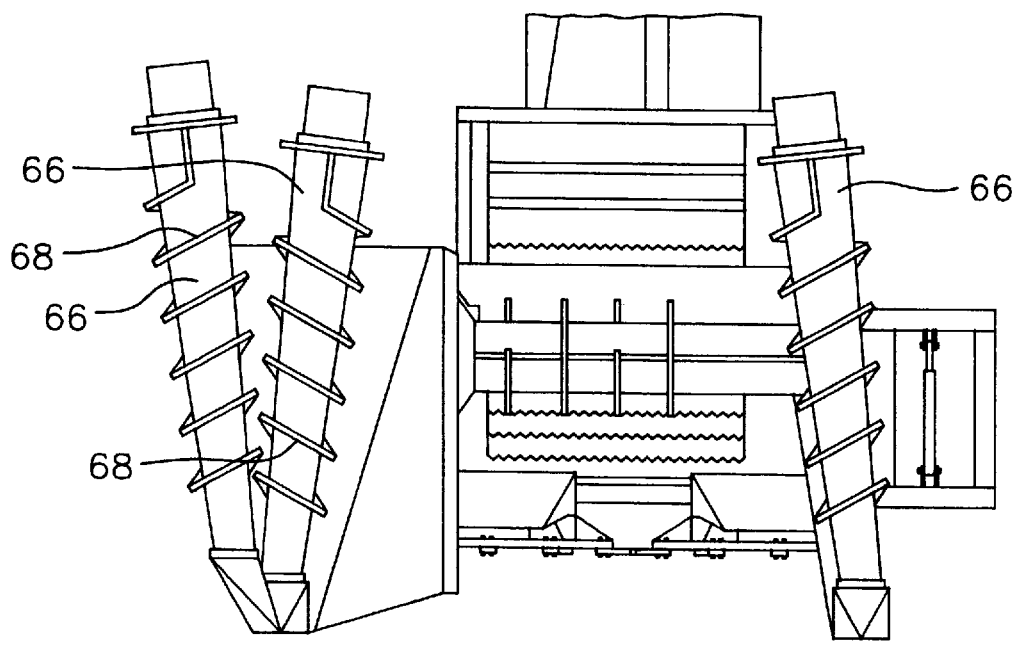
FIG. 3 is a front elevational view of the crop divider mechanism used to lift and separate sugar cane being harvested so as to maximize the amount of sugar cane being harvested.

As shown in FIG. 3, there are two cylinders 66 on what will be the right side of the machine and a single cylinder 66 on what will be the left side of the machine. The two right cylinders include the spiral flighting 68 with the orientation of the cylinders such that they form a V-shape between them. These cylinders are adjusted in height from 3 inches below the ground line to 20 inches above the ground line.

Arms 74, maintain the attitude of the scrolls of the cylinders and vertically lift the cylinders by hydraulic cylinder. A link between the hydraulic cylinder and the upper parallel arm allows the divider mechanism 64 to float along the ground contour. Similar structure is provided for the left side cylinder 66. As the harvester advances, the cane which has been separated and repositioned into a vertical orientation by the crop divider 64 next encounter knock down feed roller 76 with radially extending paddles 78 which extend parallel to the longitudinal axis of the roller and fins 80 which extend perpendicular to the paddles 78.

The knock down roller 76 is hydraulically driven by hydraulic motors at a speed of 117 rpm. The roller is manually adjustable vertically to a height of 6½ inches. The two drive shafts bolted to the knock down roller provide bearing support and drive splines for the hydraulic motor.

As shown in FIG. 1, by contacting the knock down roller 76, the upper end of the sugar cane 34 is moved away from the machine so as to expose the base of the cane stalks. In this attitude, the base of the cane stalks are exposed for cutting by the base cutters 82.

Figure 8:
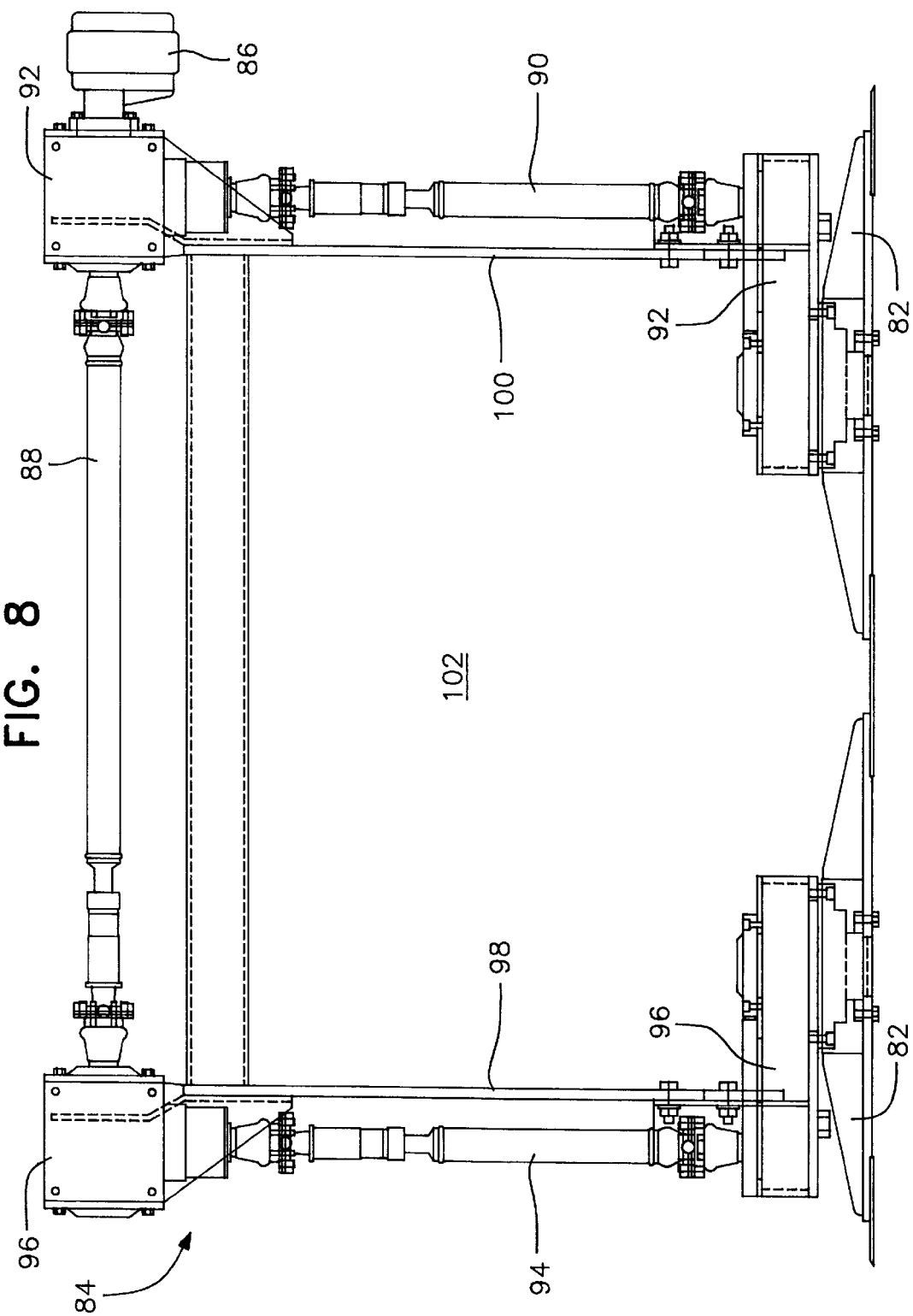
FIG. 8 is a schematic illustration of the drive system for the base cutter discs.

The base cutters include, as shown in FIG. 8, a drive mechanism 84 including a hydraulic motor 86. The hydraulic motor drives the drive assembly with an input of 1,100 rpm for a final speed of the base cutter disc of 550 rpm. Drive shafts 88 and 90 branch off from gear box 92 driven by motor 86. In the case of drive shaft 90, the shaft interconnects with a perpendicular extending gear box assembly 92 so as to mount the base cutter 82 inwardly from the drive shaft 90.

The free space above the cutter disc increases the width of sugar cane that is able to be harvested by the apparatus. Normally, the drive shaft for the base cutter would extend vertically above the base cutter and thereby narrow the gap between adjacent base cutter drive shafts. However, according to the present invention, the separation of the drive shaft 90 from a drive shaft 94, interconnected with drive shaft 88 by gear box 96, provides driving of a second base cutter disc by gear box assembly 96 so as to space the drive shafts on opposite sides of the cutter head assembly walls 98, 100, thereby defining a throat opening 102 between the sidewalls 98, 100. The blade drive gear boxes 92, 96 includes three spur gears providing a reduction ratio of 2.0:1.

In addition, the counter-rotating base cutter discs 82 include eight cutter blade sections 104. Specially designed lifter bars 105, spaced about the upper surface 107 of the cutter disc 82, aid in lifting the butt end of the cane stalks, after severing, into a butt lifter roll 109, positioned downstream from the base cutters 82.

Figure 5:
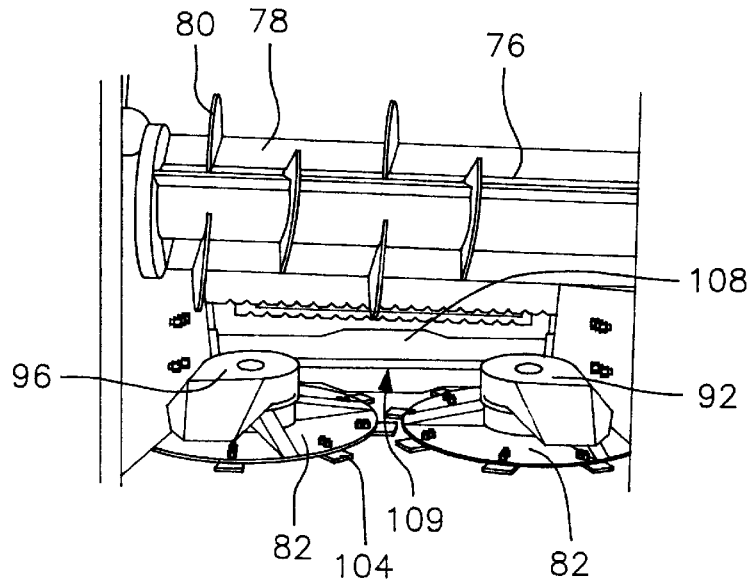
FIG. 5 is a front view showing the knock down roller and base cutter discs with the butt lifter roller shown in the background.
Figure 6:
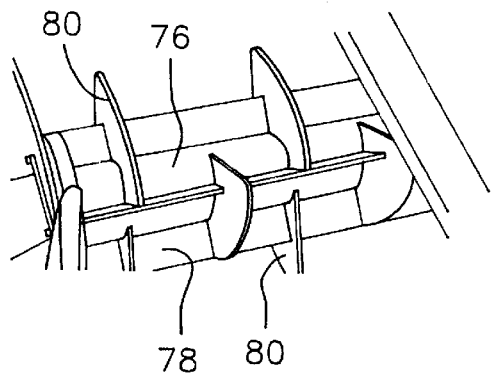
FIG. 6 is a perspective view of the knock down roller.
Figure 7:
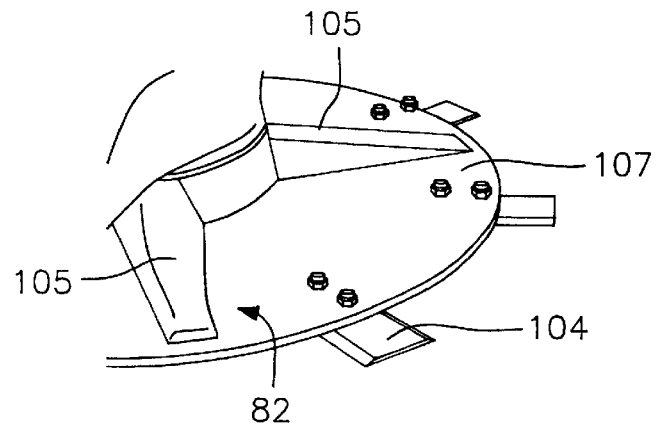
FIG. 7 is a detailed view of a base cutter disc.

As seen in FIG. 5, the butt lifter roll 109 includes a plurality of vaned paddles 108, for lifting the ends of the sugar cane at a rotation speed of 119 rpm. Located rearwardly of the butt lifter roll 109 are a plurality of fixed feed rolls 110. The four fixed feed rolls are located behind the butt lifter roll 109 and are mounted to the cutter head assembly through a bearing housing and a bearing plate. The feed rolls 110, as shown in FIGS. 9 and 10, are composed of serrated bar slats 112 mounted on support plates 120 to provide an open roll effect so as to allow dirt and debris to fall through to the ground below the fixed feed rolls.

The feed rolls are driven by one or two hydraulic motors at a speed of 148 rpm. Drive shafts 114 from a hydraulic motor 116 is directly connected into a drive spline 118 for each roll. This avoids the use of belts for the driving of the feed rolls and prevents frequent repairs and contamination of the drive mechanism of the feed rolls by debris.

As shown in FIG. 1, located above the four fixed feed rolls 110 are three floating feed rolls 122. The floating feed roll assemblies are located above the fixed feed rolls and are mounted to the cutter head assembly through a pivot point 124, 126, 128, respectively. The floating feed rolls, similar to the fixed feed rolls, are composed of serrated bar slats mounted on support plates and tubing support plates. A stiffener bar assembly is used to prevent twisting or misalignment of the roll. The floating rolls lift about the pivot point 124, 126, 128 so as to accommodate different amounts of cane 34*a* introduced into the harvester. The floating feed rolls are powered by a hydraulic motor at a speed of 148 rpm.

After being conveyed between the fixed feed rolls 110 and the floating feed rolls 122, the sugar cane 34*a* is conveyed between two rolls of a chopping system 130. The chopping system is composed of counter-rotating parallel drum shafts 132, 134 which are attached to the cutter head assembly through bearing housings. Synchronization of knife blades on the shafts 132, 134 is accomplished by an adjusting flange, an adjuster, bolts, nuts and lock washers. A hydraulic motor turns the chopper shafts 132, 134 at a speed of 200 rpm so as to divide the extended lengths of cane into defined length sections 34b.

As the cane pieces 34b leave the chopping system 130, they fall through an air stream indicated by arrows 136, as generated by a primary blower fan 138. The blower includes a body, motor, fan shaft and vanes driven by a hydraulic motor at a speed of 1500 rpm. As the cane pieces 34b pass through the air moving in the direction of arrows 136, the cane pieces fall downwardly and the trash and debris 140 are pushed upwardly into the air stream moving in the direction of arrows 142 as generated by a secondary blower 144. The direction of air generated by secondary blower 144 is up towards the top of duct 146 so as to produce a vacuum for the trash and debris 140 released from the cane pieces 34b such as to assist in the movement of the debris 140 up and out of duct 146.

Figure 13:
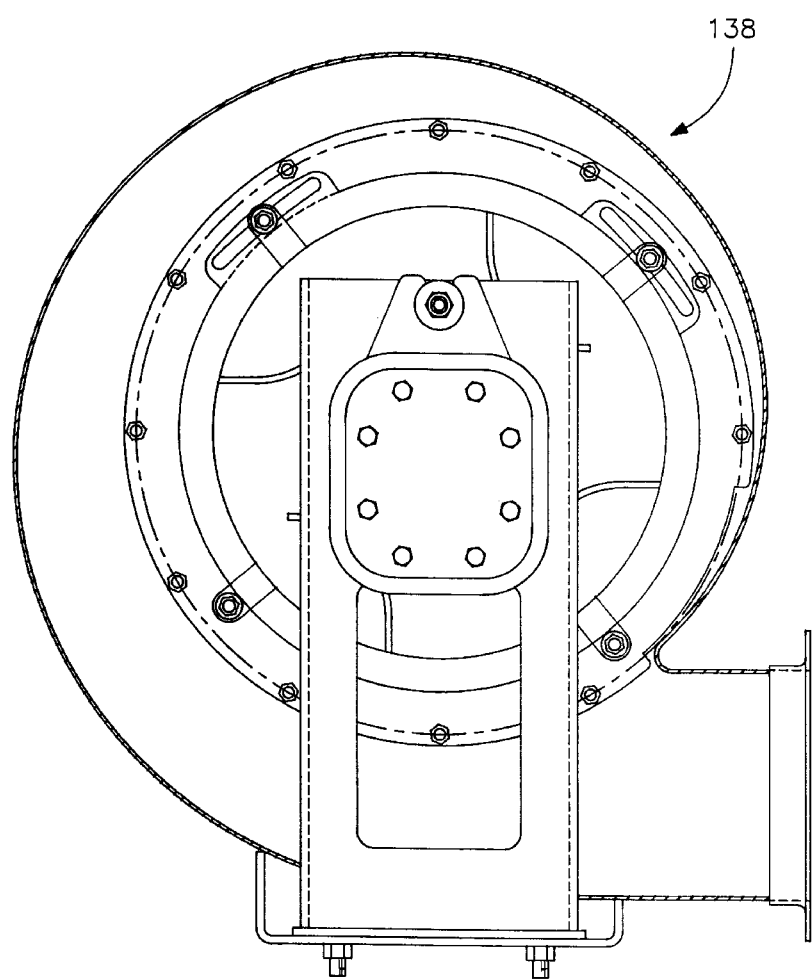
FIG. 13 illustrates one of the blowers used in the cleaning system of the present invention.
Figure 14:
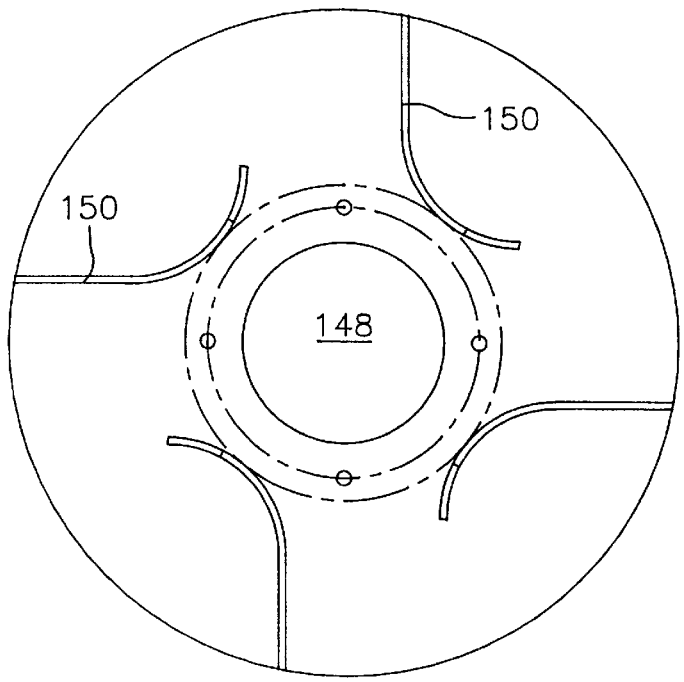
FIG. 14 illustrates the vanes of a blower of the cleaning system.
Figure 15:
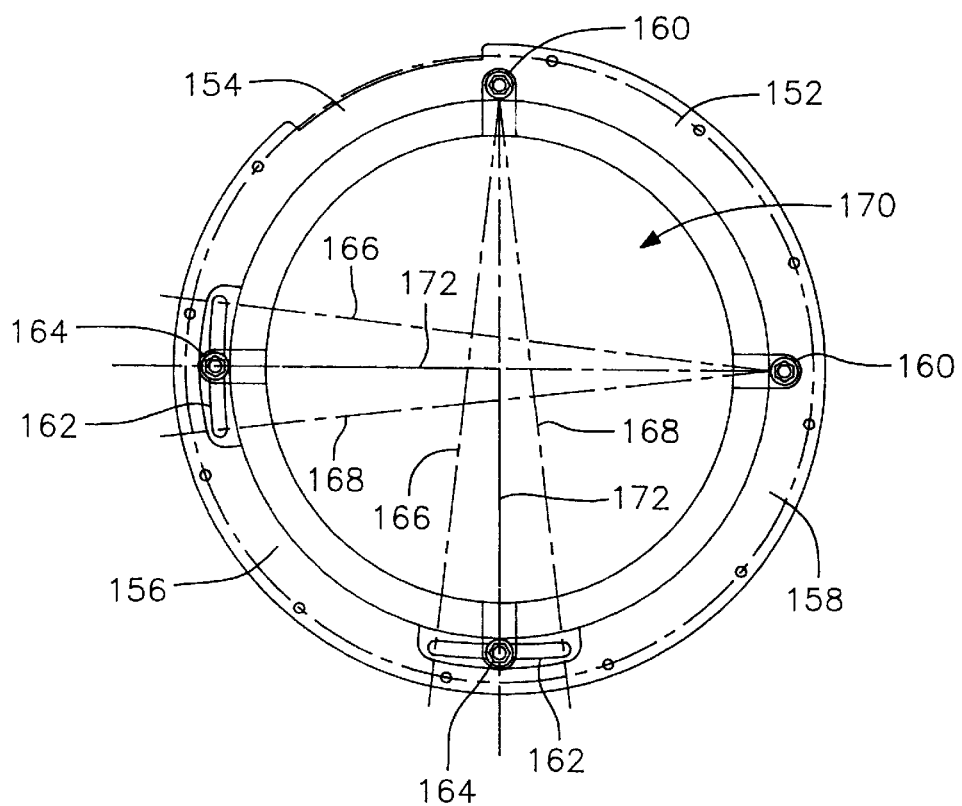
FIG. 15 illustrates the pivotable sectors of a controlled diameter air intake to the air blower.

With reference to FIGS. 13 through 15, primary blower 138 is shown and described. However, similar structure is found in secondary blower 134 as well as a third blower which will be referenced with use in the elevator system. Whereas FIG. 13 shows the overall assembly of the secondary blower 138, the blower shaft 148 and vanes 150 are shown in FIG. 14. The vanes 150 are of a curvature such that incoming air, which may include debris and dust, does not clog the interior of the blower. Air hitting the vanes 150 causes any debris contained within the air to be ejected in a radially outwardly manner after contacting the vanes 150.

In addition, damper ring sectors are used to manually control the blower inlet diameter from between 12 inches to 14 inches so as to control air flow. As shown in FIG. 15, four ring sectors 152, 154, 156 and 158 are pivotally mounted at pivot points 160 and slidably interengaged by slots 162 and nuts 164 so as to lock the position of the adjusted sectors. The dashed lines emanating from the pivot points 160 are representative of overlapping sector edge lines 166, 168 for a minimum air inlet opening 170 whereas dashed lines 172 are indicative of a maximum spread of adjacent sector with respect to each other so as to maximize the size of the air inlet opening 170.

Figure 11:
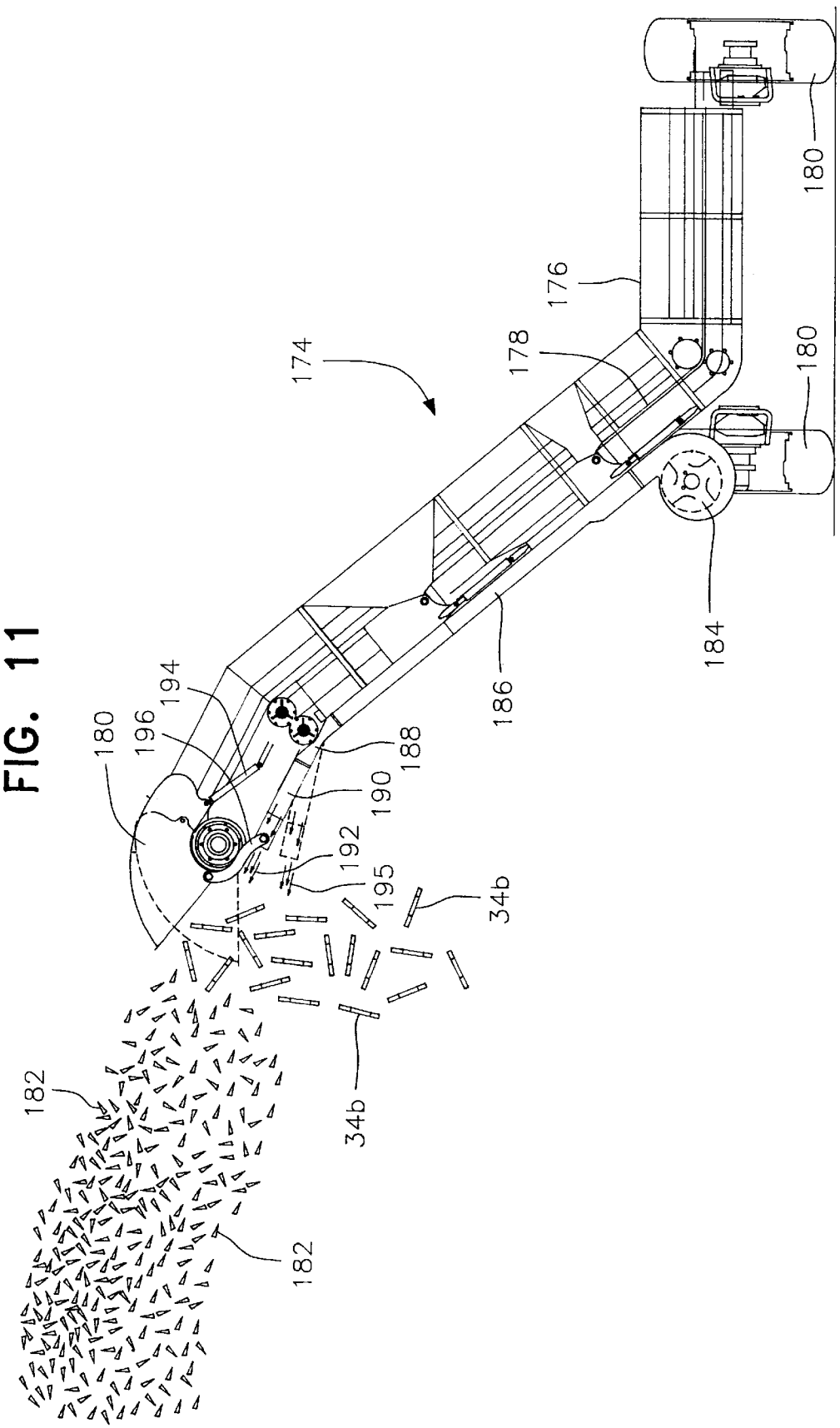
FIG. 11 is an illustration of the elevator system, shown separately from the harvester for illustration purposes only, and illustrating the separation of cut cane pieces from cane debris.

Although not shown in FIG. 1, it is understood as being part of the harvester 20 to include elevator system 174 (FIG. 11) with the base 176 of the elevator receiving the falling cane pieces 34b as transported by a continuous belt 178. For orientation purposes, rear wheels 180 shown in FIG. 11 are the same wheels 180 shown in FIG. 1.

The cane pieces 34b are conveyed by the elevator 174 until reaching a deflector hood 180 from which the cane pieces 34b are allowed to fall by gravity into a truck or carriage running along side the harvester. At this point in the conveyance of the cane pieces, there may still be additional debris 182. To ensure separation of additional debris 182 from the cane pieces 34b, a third blower 184 provides forced air into a blower duct 186. The third air blower operates at 1500 rpm.

The blower duct 186 is straight until reaching a flexible rubber boot 188. An additional duct section 190 is connected to the other side of the boot 188. The duct section 190 provides air in the direction of arrows 192 so that as cane pieces 34b are released into the atmosphere, the force of air moving into the direction of arrows 192 will blow debris 182 away from the cane pieces and into the surrounding environment.

Figure 12:
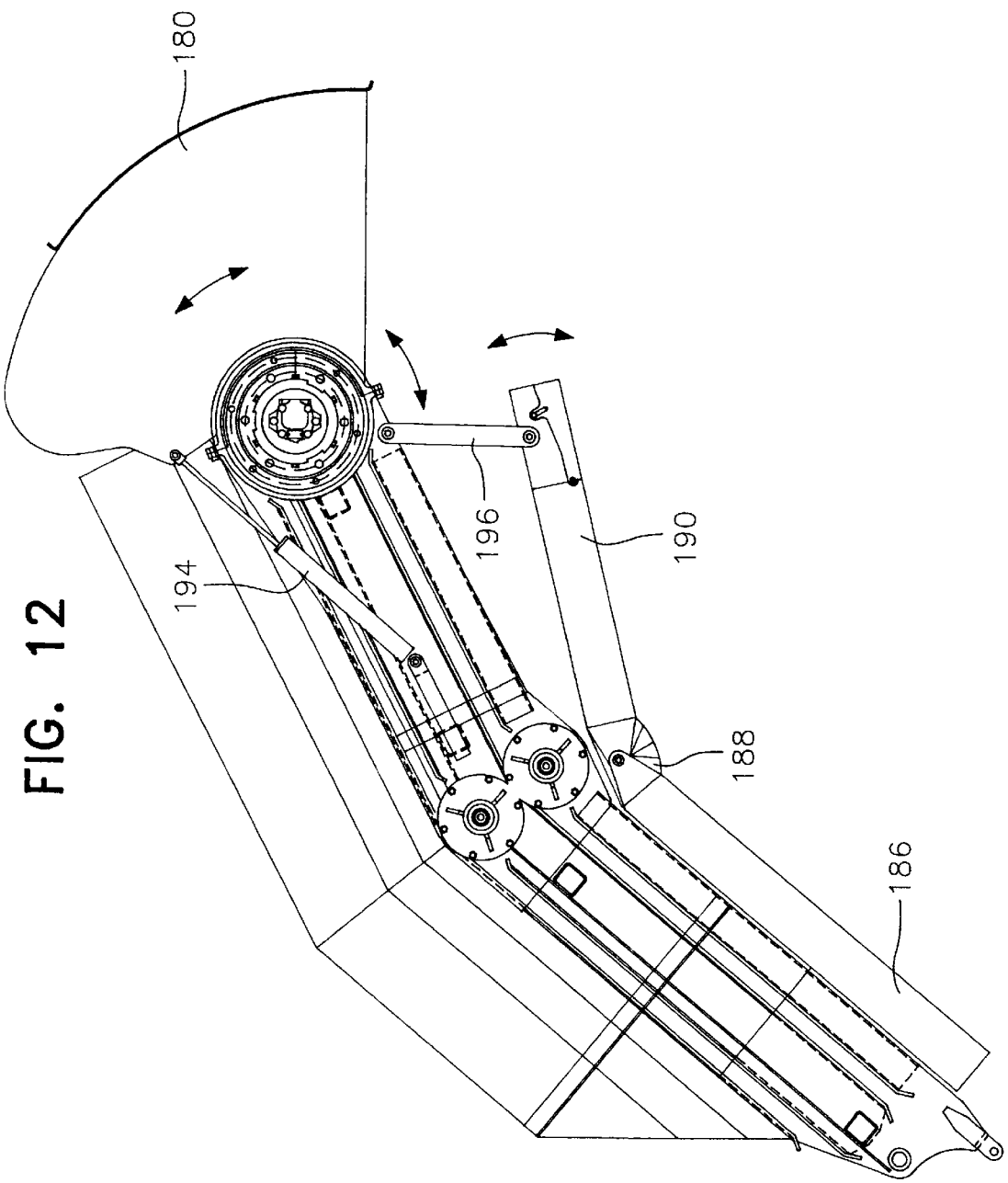
FIG. 12 is an enlarged view of the exit end of the elevator system so as to illustrate the delivery system for the final end product and how any remaining debris is separated from the cut cane pieces no matter what angle the cut cane pieces are delivered from the elevator system.

However, if it is necessary to change the direction of the deflector hood 180 by actuation of a hydraulic cylinder 194 as shown in FIG. 12, a linkage 196 connecting the elevator 174 and duct section 190 provides for movement of the duct section 190 coordinated with the angle of release of cane pieces 34b from the deflector 180. Therefore, as shown in FIG. 12, the downward movement of the deflector hood 180 from the position shown in FIG. 11 to the position shown in FIG. 12, causes the duct section 190 to be similarly moved to the position shown in solid lines in FIG. 12 and in dotted lines in FIG. 11 so that the air stream generated by arrows 195 in FIG. 11 will be optimally positioned to force any remaining debris 182 away from the cane pieces 34b.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. A sugar cane combine harvester comprising:

a chassis, a topper for cutting tops of sugar cane stalks, said topper being pivotally mounted on said chassis, a crop divider mechanism mounted on said chassis for lifting and separating sugar cane, a knock down roller mounted on said chassis for bending sugar cane away from the chassis, at least one base cutter mounted on said chassis for cutting a base of the sugar cane, a feed and chopping system mounted on said chassis for conveying sugar cane and cutting the sugar cane into pieces, and a cleaning system for separating debris from cut pieces of sugar cane, said cleaning system including a first blower fan for separating debris from cut pieces of sugar cane released from the feed and chopping system and a second blower fan for blowing air towards a top of the debris released from the feed and chopping system so as to produce a vacuum effect on the debris pushed by the first blower fan.

2. A sugar cane combine harvester as claimed in claim 1, wherein said feed and chopping system includes feed rollers having bars on edge to convey sugar cane and allowing debris to fall between the feed rollers to the ground.

3. A sugar cane combine harvester as claimed in claim 2, wherein the feed rollers include fixed feed rollers and floating feed rollers mounted above the fixed feed rollers.

4. A sugar cane combine harvester as claimed in claim 1, wherein a shape of vanes of the first blower fan prevent clogging of the air blower with debris.

5. A sugar cane combine harvester as claimed in claim 1, wherein a drive system for the at least one cutter disc is positioned laterally of the cutter disc so as to maximize available space for passage of cut sugar cane above the cutter disc.

6. A sugar cane combine harvester as claimed in claim 1, wherein a third blower fan is directed towards pieces of sugar cane as the pieces of sugar cane are released from an upper end of an elevator system.

7. A sugar cane combine harvester as claimed in claim 6, wherein a direction of air forced from the third blower fan is automatically changed for impingement on the pieces of sugar cane with a change in direction of release of the pieces of sugar cane from the elevator system.

8. A sugar cane combine harvester as claimed in claim 1, wherein an air inlet to the first blower fan is variable.

9. A sugar cane combine harvester comprising:

a chassis, a topper for cutting tops of sugar cane stalks, said topper being pivotally mounted on said chassis, a crop divider mechanism mounted on said chassis for lifting and separating sugar cane, a knock down roller mounted on said chassis for bending sugar cane away from the chassis, at least one base cutter mounted on said chassis for cutting a base of the sugar cane, a feed and chopping system mounted on said chassis for conveying sugar cane and cutting the sugar cane into pieces, said feed and chopping system including a plurality of feed rollers, said feed rollers each including a plurality of spaced apart support plates, each support plate having a central portion and a plurality of arms extending radially outwardly from said central partial, a plurality of bars extending across between said plurality of spaced apart support plates and being secured to said arms so as to leave a gap between the central portions of the spaced apart support plates, said bars including a radially outermost serrated edge to convey sugar cane and to allow debris to fall between the support plates and bars of the feed rollers to the ground, and a cleaning system for separating debris from cut pieces of sugar cane.

10. A sugar cane combine harvester as claimed in claim 9, wherein the feed rollers include fixed feed rollers and floating feed rollers mounted above the fixed feed rollers.

11. A sugar cane combine harvester comprising:

a chassis, a crop divider mechanism mounted on said chassis for lifting and separating sugar cane, a knock down roller mounted on said chassis for bending sugar cane to expose a bottom portion, a base cutter mounted on said chassis for cutting the bottom portion of the sugar cane, a feed and chopping system mounted on said chassis for conveying the sugar cane cut by the base cutter and cutting the sugar cane into pieces, an elevator system for elevating the pieces of sugar cane from the feed and chopping system and releasing the pieces of sugar cane to another conveyor for processing of the sugar cane, and a cleaning system for separating debris from cut pieces of sugar cane, said cleaning system including a first blower fan for separating debris from cut pieces of sugar cane released from the feed and chopping system and a second blower fan for blowing air towards a top of the debris released from the feed and chopping system so as to produce a vacuum effect on the debris pushed by the first blower fan.

12. A sugar cane combine harvester as claimed in claim 11, wherein said feed and chopping system includes feed rollers having bars on edge to convey sugar cane and allowing debris to fall between the feed rollers to the ground.

13. A sugar cane combine harvester as claimed in claim 12, wherein the feed rollers include fixed feed rollers and floating feed rollers mounted above the fixed feed rollers.

14. A sugar cane combine harvester as claimed in claim 11, wherein a topper for cutting upper portions of the sugar cane is pivotally mounted on said chassis.

15. A sugar cane combine harvester as claimed in claim 11, wherein the crop divider includes three scrolls with two scrolls mounted on one side of the chassis and one scroll mounted on an opposite side of the chassis.

16. A sugar cane combine harvester as claimed in claim 11, wherein a third blower fan is directed towards pieces of sugar cane as the pieces of sugar cane are released from an upper end of said elevator system.

17. A sugar cane combine harvester as claimed in claim 16, wherein a direction of air forced from the third blower fan is automatically changed for impingement on the pieces of sugar cane with a change in direction of release of the pieces of sugar cane from the elevator system.

18. A sugar cane combine harvester as claimed in claim 11, wherein a drive system for the at least one cutter disc is positioned laterally of the cutter disc so as to maximize available space for passage of cut sugar cane above the cutter disc.

19. A sugar cane combine harvester comprising:

a chassis, a topper for cutting tops of sugar cane stalks, said topper being pivotally mounted on said chassis, a crop divider mechanism mounted on said chassis for lifting and separating sugar cane, a knock down roller mounted on said chassis for bending sugar cane away from the chassis, at least one base cutter mounted on said chassis for cutting a base of the sugar cane, a feed and chopping system mounted on said chassis for conveying sugar cane and cutting the sugar cane into pieces, a cleaning system for separating debris from cut pieces of sugar cane, and a drive system for the at least one cutter disc being positioned laterally of the cutter disc so as to maximize available space for passage of cut sugar cane above the cutter disc, said drive system including two vertically extending drive shafts interconnected by a horizontally extending shaft.

20. A sugar cane combine harvester as claimed in claim 19, wherein there are two cutter discs, with each of said two vertically extending drive shafts terminating in a gear box assembly located laterally outwardly from a respective cutting disc.

21. A sugar cane combine harvester comprising:

a chassis, a topper for cutting tops of sugar cane stalks, said topper being pivotally mounted on said chassis, said topper including two gathering discs and a shredder drum, said two gathering discs including a plurality of teeth with the teeth of one gathering disc almost contacting the teeth of the other gathering disc to define a path between juxtaposed teeth for the tops of sugar cane, said shredder drum including a plurality of vertically spaced discs of cutting segments with the cutting segments on each disc being spaced from each other, said path of juxtaposed teeth of the gathering discs being aligned with one side of said shredder drum to feed the cane tops to the plurality of discs of cutting segments so as to cut the cane tops into small pieces for incorporation into field soil during post harvest cultivation processes, a crop divider mechanism mounted on said chassis for lifting and separating sugar cane, a knock down roller mounted on said chassis for bending sugar cane away from the chassis, at least one base cutter mounted on said chassis for cutting a base of the sugar cane, a feed and chopping system mounted on said chassis for conveying sugar cane and cutting the sugar cane into pieces, and a cleaning system for separating debris from cut pieces of sugar cane.

* * * * *